US011410545B2

(12) United States Patent
Herman

(10) Patent No.: US 11,410,545 B2
(45) Date of Patent: Aug. 9, 2022

(54) DYNAMIC VEHICLE PERIMETER DEFINITION AND REPORTING

(71) Applicant: FORD GLOBAL TECHNOLOGIES, LLC, Dearborn, MI (US)

(72) Inventor: David Michael Herman, Oak Park, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 286 days.

(21) Appl. No.: 16/516,709

(22) Filed: Jul. 19, 2019

(65) Prior Publication Data

US 2021/0020031 A1 Jan. 21, 2021

(51) Int. Cl.
| | | |
|---|---|---|
| G06F 19/00 | (2018.01) | |
| G08G 1/01 | (2006.01) | |
| H04W 4/46 | (2018.01) | |
| B60N 2/00 | (2006.01) | |

(52) U.S. Cl.
CPC ............ *G08G 1/0112* (2013.01); *H04W 4/46* (2018.02); *B60N 2/002* (2013.01)

(58) Field of Classification Search
CPC ........ G08G 1/0112; H04W 4/46; B60N 2/002
USPC ........................................................ 701/120
See application file for complete search history.

(56) References Cited

U.S. PATENT DOCUMENTS

| | | | | |
|---|---|---|---|---|
| 10,089,872 B1* | 10/2018 | Beaurepaire | ............. | G08G 1/20 |
| 10,131,359 B2 | 11/2018 | Feifel et al. | | |
| 10,134,280 B1* | 11/2018 | You | .......................... | B60Q 1/34 |
| 10,558,224 B1* | 2/2020 | Lin | ......................... | G08G 1/165 |
| 10,860,016 B1* | 12/2020 | Wang | .................... | E02F 9/2054 |
| 10,885,354 B2* | 1/2021 | Maeda | ............... | G06K 9/00805 |
| 2001/0044697 A1* | 11/2001 | Kageyama | ............. | G08G 1/163 |
| | | | | 701/301 |
| 2006/0095207 A1* | 5/2006 | Reid | .................. | G06K 9/00664 |
| | | | | 701/301 |
| 2010/0286875 A1* | 11/2010 | Inoue | ................... | B62D 15/027 |
| | | | | 701/49 |
| 2014/0092249 A1 | 4/2014 | Freiburger | | |

(Continued)

FOREIGN PATENT DOCUMENTS

| | | |
|---|---|---|
| CN | 201569418 | 9/2010 |
| CN | 105806223 A | 7/2016 |
| WO | 2017194063 A1 | 11/2017 |

OTHER PUBLICATIONS

Tsukada, Manabu. "Roadside-Assisted V2V Messaging for Connected Autonomous Vehicle." 2017.

(Continued)

*Primary Examiner* — Kerri L McNally
*Assistant Examiner* — Thang D Tran
(74) *Attorney, Agent, or Firm* — Frank Lollo; Brooks Kushman P.C.

(57) ABSTRACT

A vehicle may determine that it is stopped and detect a perimeter-modification event predefined as correlating to a changed vehicle perimeter. The vehicle may further, responsive to the perimeter-modification event, define an expanded vehicle perimeter, larger than a perimeter predefined as representing the vehicle in travel. The perimeter expansion may be done in accordance with a predefined modification associated with the detected perimeter modification event. The vehicle may additionally wirelessly share the expanded vehicle perimeter with at least one other vehicle.

20 Claims, 4 Drawing Sheets

(56) References Cited

U.S. PATENT DOCUMENTS

| | | | |
|---|---|---|---|
| 2015/0360625 A1 | 12/2015 | Randler et al. | |
| 2016/0063865 A1* | 3/2016 | Flemhmig | G08G 1/167 |
| | | | 348/46 |
| 2016/0229409 A1* | 8/2016 | Pascheka | B60W 50/0097 |
| 2016/0253902 A1* | 9/2016 | Yokoi | G08G 1/0112 |
| | | | 348/149 |
| 2016/0272199 A1* | 9/2016 | Kawahara | B60W 30/08 |
| 2017/0001637 A1* | 1/2017 | Nguyen Van | G01S 13/931 |
| 2017/0102700 A1* | 4/2017 | Kozak | G05D 1/0061 |
| 2017/0106750 A1* | 4/2017 | Tauchi | G02B 27/0101 |
| 2017/0162054 A1* | 6/2017 | Nespolo | B60Q 1/525 |
| 2017/0174262 A1* | 6/2017 | Kobayashi | G01S 19/14 |
| 2017/0262790 A1* | 9/2017 | Khasis | G08G 1/0116 |
| 2017/0277184 A1* | 9/2017 | Fujimura | G08G 1/09623 |
| 2017/0341652 A1* | 11/2017 | Sugawara | B60W 30/095 |
| 2017/0352263 A1* | 12/2017 | Umehara | G08G 1/0133 |
| 2018/0003516 A1* | 1/2018 | Khasis | G08G 1/20 |
| 2018/0004213 A1* | 1/2018 | Absmeier | G05D 1/0214 |
| 2018/0081358 A1* | 3/2018 | Laur | G05D 1/0055 |
| 2018/0105152 A1* | 4/2018 | Nagae | G08G 1/165 |
| 2018/0113459 A1* | 4/2018 | Bennie | G05D 1/028 |
| 2018/0201138 A1* | 7/2018 | Yellambalase | B60L 58/12 |
| 2018/0357901 A1* | 12/2018 | Beaurepaire | B60W 40/00 |
| 2019/0039614 A1* | 2/2019 | Nagata | B60W 30/09 |
| 2019/0078370 A1* | 3/2019 | Pohl | E05F 15/79 |
| 2019/0210517 A1* | 7/2019 | Baker | G07C 5/0825 |
| 2019/0211587 A1* | 7/2019 | Ganeshan | B60R 21/0153 |
| 2019/0225150 A1* | 7/2019 | Nohl | G01S 17/931 |
| 2019/0287407 A1* | 9/2019 | Branscombe | G01C 21/3461 |
| 2019/0309564 A1* | 10/2019 | Mitchell | E05B 81/70 |
| 2019/0389461 A1* | 12/2019 | Ohmura | B60W 30/10 |
| 2020/0010017 A1* | 1/2020 | Cho | G06K 9/00805 |
| 2020/0023837 A1* | 1/2020 | Yokoi | B60W 30/0953 |
| 2020/0111363 A1* | 4/2020 | Maeda | G08G 1/04 |
| 2020/0150652 A1* | 5/2020 | Urano | B60W 50/14 |
| 2020/0254928 A1* | 8/2020 | Monteiro | E05F 15/40 |
| 2020/0257909 A1* | 8/2020 | Korman | G08G 1/143 |
| 2020/0307554 A1* | 10/2020 | Lai | G08G 1/143 |
| 2020/0334981 A1* | 10/2020 | Yamada | G01C 21/3815 |
| 2020/0349345 A1* | 11/2020 | Hodge | G06Q 30/08 |
| 2021/0001806 A1* | 1/2021 | Kim | B60R 25/24 |
| 2021/0188096 A1* | 6/2021 | Yu | B60R 16/033 |

OTHER PUBLICATIONS

Nguyen, Björnborg. Real world applications and analysis of V2X communication in the 2016 Grand V2X communication in the 2016 Grand Cooperative Driving Challenge, MS thesis. 2016.

* cited by examiner

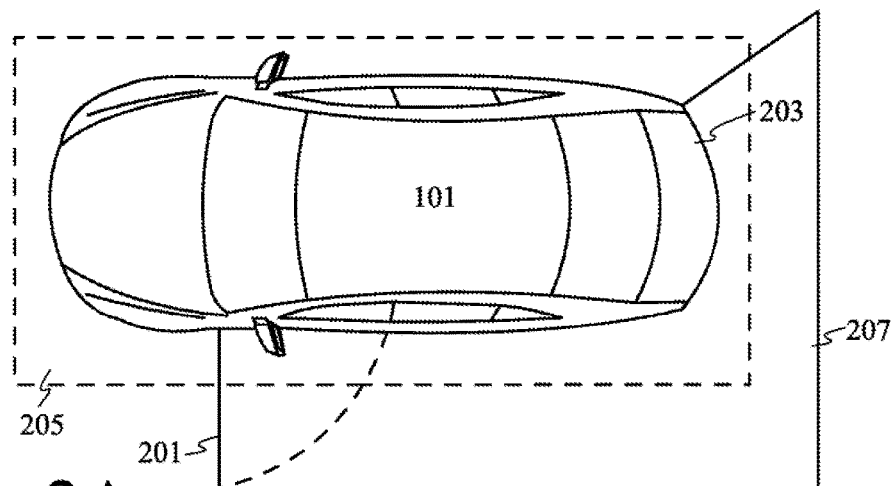
Fig. 2A
Fig. 2B
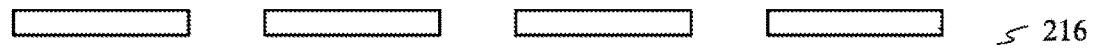
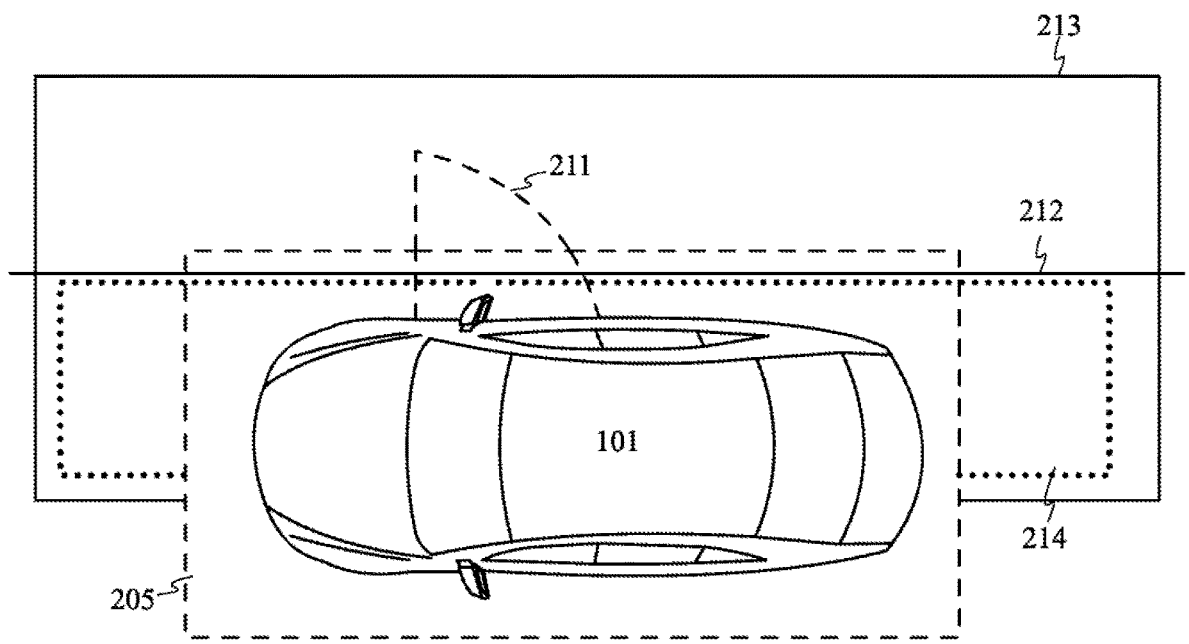

DYNAMIC VEHICLE PERIMETER DEFINITION AND REPORTING

TECHNICAL FIELD

The illustrative embodiments generally relate to methods and apparatuses for dynamic vehicle perimeter definition and reporting.

BACKGROUND

With increasing reliance on driving assist modes and self-driving or partially self-driving vehicles, environmental awareness becomes ever more important for autonomous or partially autonomous vehicles. For example, a human can easily see a pothole or other obstruction in a road. and react, and vehicles must be able to do the same, if people are to trust them to self-drive. Also, humans can react quickly to dynamic situations (e.g., an animal darting in front of a vehicle) while a vehicle must also be able to detect the altered situation and behave in an appropriate manner.

While animals may not signal their intent in a discernable fashion, some of the reliance on sensors and reaction systems can be mitigated by vehicles informing other vehicles of their states, and planned actions. This can include, for example, vehicles defining their perimeter to aid in avoiding unintended vehicle interactions, vehicles broadcasting turn, speeding up, or slowing down plans, etc. Even with this advanced information, however, there is still a good deal of reliance on sensor and reaction systems to adapt to instantaneously changing environmental conditions.

SUMMARY

In a first illustrative embodiment, a vehicle includes a processor configured to determine that the vehicle is stopped. The processor is also configured to detect a perimeter-modification event predefined as correlating to a changed vehicle perimeter. The processor is further configured to, responsive to the perimeter-modification event, define an expanded vehicle perimeter, larger than a perimeter predefined as representing the vehicle in travel, in accordance with a predefined modification associated with the detected perimeter modification event and wirelessly share t expanded vehicle perimeter with at least one other vehicle.

In a second illustrative embodiment, a method includes determining that a vehicle has stopped in a location having a characteristic indicating that the location is not part of a parking lot. The method also includes defining an expanded vehicle perimeter, larger than a perimeter predefined as representing the vehicle in travel, responsive to the determining and based at least in part on a speed limit associated with a road within a predefined distance of the location and wirelessly sharing the expanded vehicle perimeter with at least one other vehicle.

In a third illustrative embodiment, a non-transitory storage medium, storing instructions that, when executed by a vehicle processor, cause the vehicle processor to perform a method including defining an expanded vehicle perimeter, larger than a perimeter predefined as representing the vehicle in travel, responsive to determining that a vehicle has stopped and that a vehicle compartment has been unlatched or opened, wherein the perimeter includes at least a path leading from an occupied vehicle seat to the compartment, and wherein the path is at least as wide as a fully opened vehicle door adjacent to the occupied seat. The method further includes wirelessly sharing the expanded vehicle perimeter with at least one other vehicle.

BRIEF DESCRIPTION OF THE DRAWING

FIGS. 2A and 2B show adaptable vehicle perimeters that have changed based on both vehicle element changes and vehicle present locations;

DETAILED DESCRIPTION

Figure 1:
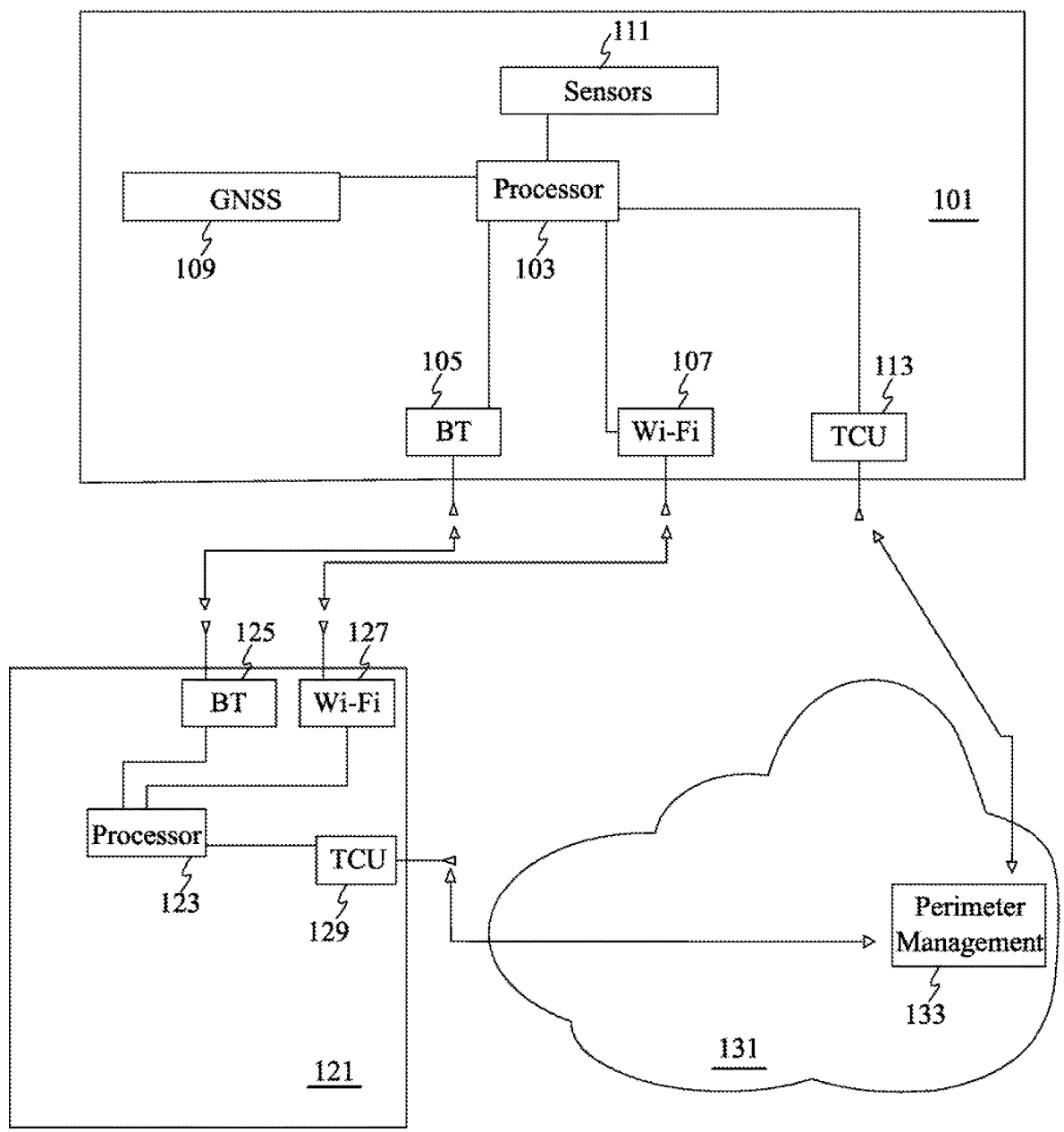
FIG. 1 shows an illustrative two vehicle system with a cloud-reporting element.

As required, detailed embodiments are disclosed herein; it is to be understood, however, that the disclosed embodiments are merely illustrative and may be incorporated in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

One way that vehicles may assist other vehicles in avoiding collisions is to broadcast a vehicle perimeter. This can be useful to assist a sensor in a vehicle trailing an object vehicle, for example, which may not detect the exact perimeter of the object vehicle, especially when weather or other conditions may somewhat foul sensing systems. Even if the trailing vehicle can detect the object vehicle perimeter, any measure that can mitigate the potential for an undesirable incident can be useful.

For example, when a vehicle is pulled over to the side of the road, it may broadcast its perimeter to other vehicles traveling nearby, if those vehicles are approaching the pulled-over vehicle, they may slow or change lanes to increase the likelihood of avoiding a potential issue/This system may work well for vehicles of fixed shape, but typical pulled-over vehicles have a human being in them at least at some point in time, and the behavior of the human is not automatically predictable. For example, a human desiring to change a tire may exit the vehicle, travel alongside the vehicle, and open a rear hatch of the vehicle.

These three events all potentially change the perimeter of the vehicle, and while the door and hatch events Change the perimeter in at least a predictable manner, the human travel-path may not be entirely predictable. Nonetheless, by alerting traveling vehicles that a door is open or opening, that a path that is likely to be traveled (from the door to the hatch) is occupied or may be occupied by a person, and that the hatch is or will be likely opened, traveling vehicles can improve reaction to the potential dynamic situation and diminish the likelihood of an undesirable occurrence.

Even though it is impossible to predict what a human being will actually do (e.g., the human could dart into traffic at any second), there is a reasonable expectation that a human in a vehicle with a flat tire will travel from a doorway to a spare tire, and in a vehicle with engine trouble, will travel from a doorway to an engine compartment. Humans tend to act in a self-preserving manner, so there is also a reasonable expectation that the human will keep a reasonably close proximity to the vehicle when traveling, and will often use one or more components of the vehicle as a shield against the potential encounter with other traffic elements.

Vehicles can report to other vehicles (V2V communication) or to infrastructure (V2I communication) and collectively this can be referred to as vehicle-to-X (V2X) communication. Vehicles reporting their own perimeters via V2X may dynamically update vehicle dimensions or footprint based on the vehicle's dimension as determined from the baseline configuration with adjustment based on vehicle sensors and other logic. This could result in a perimeter increase compared to baseline of the vehicle foot print based on a number of vehicle sensors and potentially based upon timing.

Onboard systems can further improve the ability of the vehicle to predict a footprint change, for example, engaging a trunk release or hood release could signal an intent of an occupant to approach the trunk or hood, and the vehicle can adjust a perimeter change prediction accordingly, even. if a door has not yet been opened. If the only occupant (detectable by a vehicle system) is a driver, for example, then the door to most likely open is the driver's side door, although if the driver climbed over to a passenger seat then the vehicle could change the prediction accordingly. In the same manner, if the driver engaged a trunk or hood, the likely path will be from the door that is likely opened to the element that was unlocked/unlatched.

Thus, for example, the vehicle can report an adjusted perimeter accommodating the door element, the path from the door to the compartment element and the change resulting from the compartment element as changes to a vehicle perimeter, which can assist other vehicles in avoiding those areas that are not commonly part of a vehicle perimeter.

FIG. 1 shows an illustrative two vehicle system with a cloud-reporting element in this illustrative example, the vehicle 101 may be in a state where a perimeter change is likely. This can include, for example, just having parked in a lot, just having pulled off of the road, or even being in the middle of the road (e.g., at a light) and detecting an element (e.g., hood/trunk) unlatching.

This vehicle 101 includes a processor 103 that is in communication with BLUETOOTH 105 and Wi-Fi 107 transceivers, which can be used for local V2X communication (which can also be cellular or any other reasonable communication medium). The vehicle 101 may also include a global navigation satellite system (GNSS) location element 109, which can determine the present location of the vehicle 101, which in turn can be used in logic that determines how a perimeter will be adapted for reporting.

Additionally, the vehicle 101 may include onboard sensors 111, which may include, but which are not limited to, seat sensors, interior and exterior cameras, tire pressure monitoring systems, latch and door engagement determination sensors, etc. These sensors can inform perimeter defining logic of conditions that may affect the determinations of such logic, such as, for example, whether a tire is flat, an element is locked, unlocked, open or opening, where people are located in the vehicle, etc.

The vehicle 101 further includes a telematics control unit (TCU) 113, which can be used for vehicle to cloud (V2C) reporting. In instances where vehicles are traveling at high speeds, the vehicle 101 may not always be in direct local communication with other traveling vehicles, but the other vehicles may benefit from knowing that, for example, vehicle 101 has a flat tire and that there will be an expanded perimeter associated therewith until the tire state is corrected. Thus, a vehicle that is one mile away (out of conventional wireless range) but traveling at 80 miles an hour will arrive at the stopped vehicle 101 in less than a minute, and may do well to slow its speed or change a lane. By leveraging a cloud 131 system 133 that can track any reported vehicle perimeters or perimeter changes, and which can share those changes with other vehicles in proximity to the changed vehicle, the system can improve the reaction ability of vehicles that would otherwise be unaware of the change until they traveled within wireless range (often a few hundred feet) only seconds before actually reaching the stopped vehicle 101.

These other vehicles 121 may also include onboard processing 123 and may be able to communicate directly with vehicle 101 via BLUETOOTH 125 and Wi-Fi 127 transceivers. They may also include TCUs 129 for at least the reasons previously stated with respect to cloud-sharing of vehicle perimeters.

Perimeter reporting can also be useful in less tense situations, such as when a vehicle 101 parks in a parking lot and disengages a lift-gate. If the lift gate will swing backwards (e.g., such as in a sport utility vehicle), which will create a temporary roadside object, the vehicle 101 notifying other vehicles 121 of the coming state change can help the other vehicles 121 avoid the lift gate that is about to change. While most vehicles 121 in parking lots are traveling at low speeds, they are also generally in close proximity to other vehicles, as well as being perpendicular to parked vehicles 101, and thus can more easily come into contact with lift gates and pedestrians in proximity to the parked vehicles 101. Adapting reported vehicle perimeters to accommodate changing vehicle 101 states and likely occupant actions can help diminish risk in these situations.

FIGS. 2A and 2B show adaptable vehicle perimeters that have changed based on both vehicle element changes and vehicle present locations. In FIG. 2A, the illustrative vehicle 101 is parked in a parking lot or in an area where there is not high traffic. While the system does not necessarily need to make this distinction, if the intent is to be reasonably precise for a given situation. without creating overly aggressive perimeters, this is an example of how where the vehicle 101 is located can change the definition of a perimeter. While it is certainly an option to simply expand the vehicle 101 perimeter based on the vehicle 101 being stopped, doing so in a less precise manner in, for example, a parking lot, could create issues for vehicles 121 attempting to travel the lot, if each vehicle 101 that had just parked was assigned an overly aggressive perimeter that accommodated every possible variable. Again, the impact of expanding the perimeter is weighed against the value of expanding the perimeter for a given solution, so this does not foreclose on a particular solution, but rather explains how differing degrees of precision about the expanded perimeter can be used based on vehicle 101 location and, for example, expectations about what nearby traffic is likely to do based on that location as well.

In this example, the vehicle 101 has parked and a driver side door 201 has opened. Dotted perimeter 205 defines the typical perimeter associated with a vehicle 101 having closed doors, which allows other vehicles 121 to travel in near proximity with limited expectation of collision (e.g., presumably no one is going to open a door when a vehicle 101 is traveling down the road at 45 miles per hour).

In this example, the door 201 has been opened and the rear hatch 203 has been engaged to open. This can cause the vehicle 101 to define and broadcast an expanded perimeter 207, which is coupled with the existing perimeter 205. This expanded perimeter 207 defines a path from the open door that is as wide as the door (so that no vehicle 121 travels within this zone and strikes the door) and that also provides a footpath for an occupant to reach the rear hatch 203 without a vehicle 121 impeding that path. Obviously, the human could move out of this path at any time, but this at least defines a zone that provides an expectation for other vehicles 121 that this zone is "part of" the vehicle 101 that should be avoided.

The vehicle 101 can broadcast this path to the cloud 131 and to other vehicles 121, and can include an indicator of "footpath" or other indicates that indicates that a person may be in this area, if that would, for example, cause vehicle 121 to slow in other examples, vehicle 121 will simply treat this as part of vehicle 101 and avoid it as it would avoid the actual perimeter 205 that otherwise exists around vehicle 101. In some examples, the footpath may extend around the perimeter from each location where an occupant is known to exist to the point on the vehicle expected to be accessed, so that if anyone exits the vehicle, they are at least initially standing within the predefined footpath.

The geometry can be even more refined if desired, for example defining a small rectangle around the door, and then defining the path once the occupant has actually left a seat. In other examples, the door and/or path geometry might be defined upon unlocking the door or engaging the handle, before the door is even open, depending on the degree of precision and timing desired.

In FIG. 2B, the vehicle 101 is stopped by the roadside, where highway traffic travels on road 216. Element 212 is the edge of the shoulder, and so while vehicle 101 is off the shoulder 212, the door 211, when opened, extends past the shoulder 212. Also, in this example the vehicle 101 has the common standard perimeter of 205 that it would define when moving and/or when there is no expectation of a perimeter change or a need for a footpath.

In one example, the very fact that the vehicle 101 has stopped could cause expanded perimeter 213 to be defined, because of the possibility that someone may exit the vehicle 101 or open the door 211. In another example, if there is no passenger, the perimeter 214 may be bounded by the roadside 212, since there is a limited expectation of that door being opened, being both the less-safe door and because there is no person on that side of the vehicle 101 presently.

Once the door 211 is opened, or unlocked, assuming the door is the trigger for the perimeter 213, the vehicle 101 defines an expanded perimeter 213 that includes 214 as well. This is an aggressive perimeter that can cause other vehicles 121 to determine that there is a large zone around. this vehicle 101 to be avoided. This can accommodate fast-moving vehicles 121 as well as unexpected. movement by the human, and in most instances the vehicles 121 will move to the further away lane because the perimeter indicates that the other lane is partially blocked. The length of the perimeter 213, 214 trailing some distance behind the vehicle 101 provides a guide for the vehicles 121 to move to the other lane sooner than reaching the vehicle 101, which may provide added assurances for any humans moving in proximity to vehicle 101.

These are two examples of how vehicles 101 can dynamically redefine their perimeters to create temporary alterations to a broadcast vehicle perimeter 213, 214 used by other vehicles 121 to react to the presence of vehicle 101.

Figure 3:
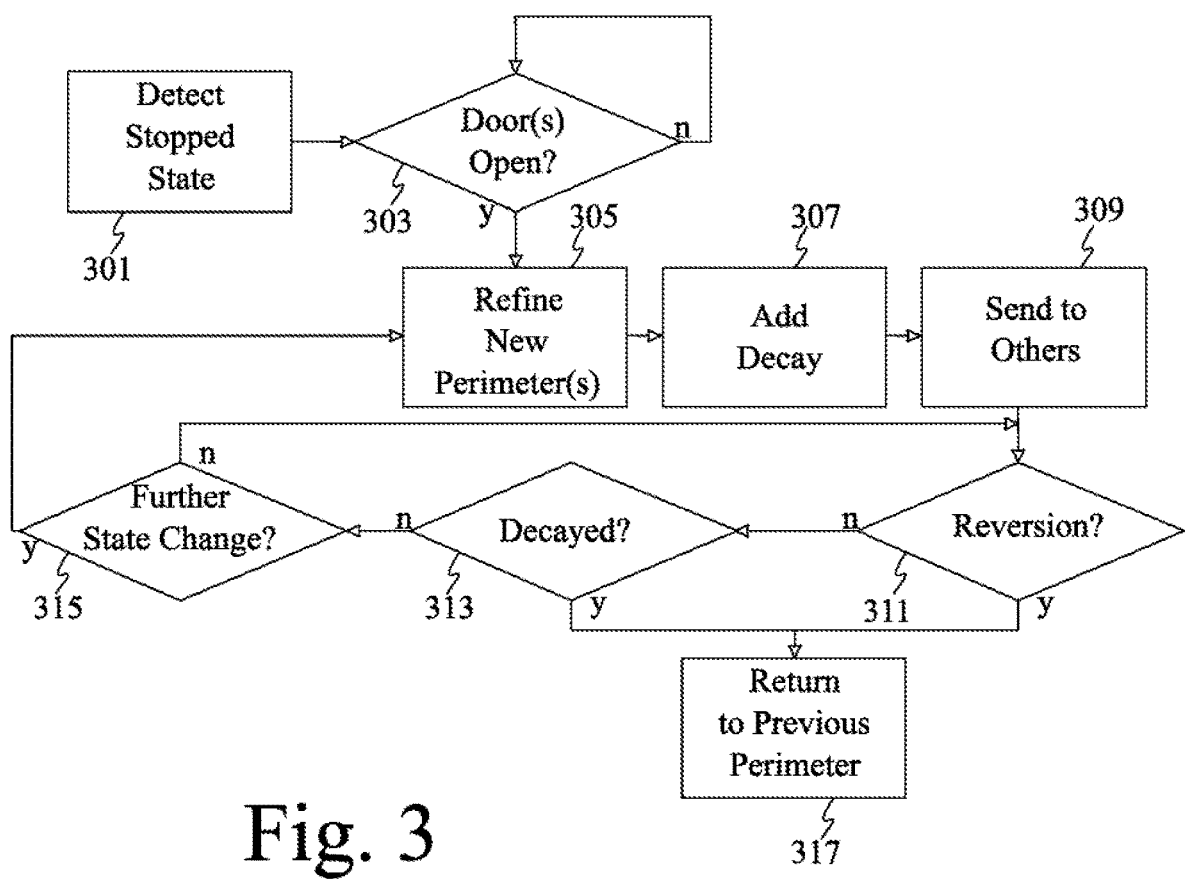
FIG. 3 shows an illustrative process for perimeter definition.

FIG. 3 shows an illustrative process for perimeter definition executable by, for example, a processor 103 of vehicle 101. In this example, the vehicle 101 detects that it has reached a stopped state at 301. In this example, a door opening is a trigger, so the vehicle 101 does not necessarily have to be aware of where it is stopped (since vehicles frequently stop at stop signs and street lights without any occupant intention of opening a door).

If the door opens at 303, the vehicle 101 defines a new vehicle 101 perimeter at 305, which can accommodate at least a zone that is the size of the path of the door from closed to fully open. The vehicle 101 may also define a zone of travel as part of the new perimeter, and either element may have a decay factor associated therewith at 307. The decay factor may be useful if the vehicle 101 is unable to update a state for some reason, and could be set at, for example, five minutes or some other reasonable number so that, for example, the cloud did not continue to report the enhanced perimeter long after the door had been closed, if the vehicle 101 was unable to report the door closing event.

The vehicle 101 also sends this new perimeter to other vehicles 121 in wireless communication range at 309 and/or to the cloud 131 monitoring system 133. If the door state reverts at 311 (i.e., the door is closed) and/or if the decay occurs at 313, vehicles 121 receiving the enhanced perimeter and/or the cloud system 133 may treat the perimeter as being reverted to the previous perimeter 317. Otherwise, if there is a further state change at 315, the perimeter may be refined.

Figure 4:
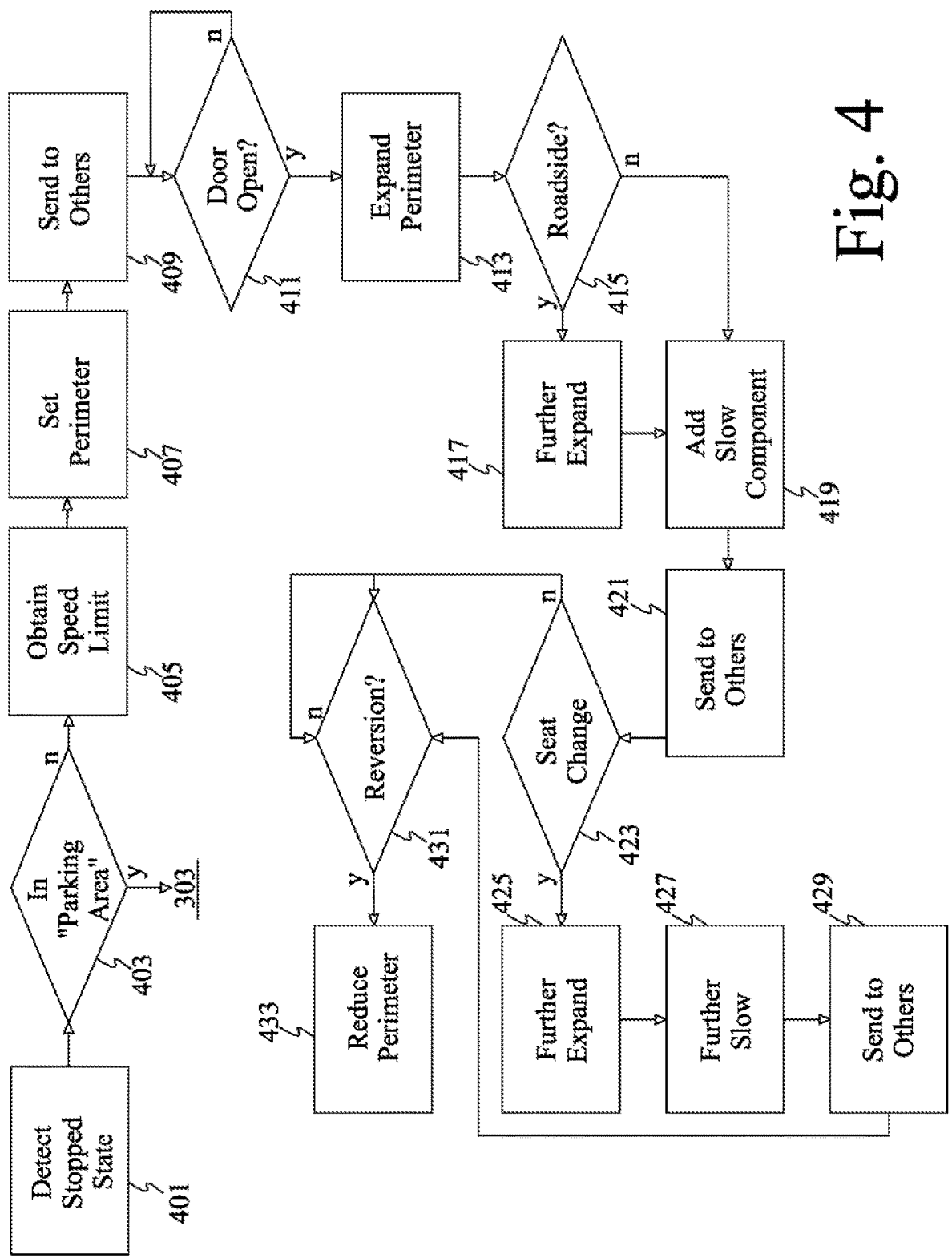
FIG. 4 shows an illustrative process for perimeter definition that accommodates a vehicle location.

FIG. 4 shows an illustrative process for perimeter definition that accommodates a vehicle location executable by, for example, a vehicle 101 processor 103. In this example, the vehicle 101 again determines that the vehicle 101 is in a stopped state at 401. In this example, the vehicle 101 will vary a perimeter alteration decision based on a location of the vehicle 101, so at 403 the vehicle 101 determines if it is located in a parking area. If the vehicle 101 is in a parking area, the higher precision decision process starting at 303 executes, which creates more limited perimeter alterations given expectations about how traffic is typically moving (slowly, with caution) in a parking area and given that many vehicles may be subject to perimeter alteration in an ongoing manner in a parking area, and so in some models precision of alteration and trigger only upon, for example, doors opening, may be desired to limit the impact on traveling vehicles 121.

In this example, if the vehicle 101 is not in a parking area at 403, the vehicle 101 obtains the speed limit for the road on which the vehicle 101 is stopped at 405. The vehicle 101 may also use location to determine if the vehicle 101 is stopped at a stop sign/street light and/or along a roadside, which can be determined, for example, either based on a vehicle 101 location not being remotely proximate to a known intersection or stop sign, or based on the vehicle 101 being definitively located along a shoulder location. A correlation to other traffic may also be made, to ensure the vehicle 101 is not stopped on a highway for no reason other than all or most other traffic is also stopped on a highway (diminishing the likelihood that a person will actually exit the vehicle 101 or open a hatch).

In this example, the vehicle 101 defines an enhanced perimeter length and/or width based on the speed limit as at least one factor at 407. So, for example, in higher speed conditions, the perimeter may be both wider (to encourage vehicles 121 to move over a lane) and longer (to encourage vehicles 121 to make a maneuver to the other lane sooner). While either variation is not necessary, it is contemplated that coupling one or both to higher speed limit zones can be useful for ensuring a reasonable zone around the vehicle 101 in which an occupant can travel if the occupant exits the vehicle 101.

The vehicle 101 sends this initial perimeter to others at 409, which can include proximate vehicles 121 in direct wireless communication with vehicle 101 or reachable through wireless relay and/or the cloud 131 system 133 if such a system exists. The cloud can then relay the perimeter to vehicles 121 that are projected to encounter vehicle 101 while it is still stationary and while a person may still be moving around the vehicle 101 or while a door may still be open.

In this model, because the vehicle 101 has already enhanced the perimeter thereof based on the stop and speed limit, the vehicle 101 waits at 411 for a door to open before expanding a perimeter further. While not a necessary step (the max perimeter could be defined on stop detection), this can add a degree of precision to the perimeter modification, which can tend to be less impactful. on traffic if the traffic is reacting to the full perimeter as though it were occupied by an object.

Once the door is opened, the vehicle 101 may expand the perimeter to accommodate at least the door path (assuming the perimeter does not already accommodate the door path) at 413, as well as further expanding a perimeter if needed to, for example, attempt to cause other vehicles 121 to definitively change lanes if, for example, the vehicle 101 is stopped next to a busy highway and if an occupant door is alongside the road.

In this example, the vehicle 101 performs an explicit determination if the occupant door is road-facing at 415. This can involve a combination of occupant detection and/or door sensors, which can include unlock sensors (indicating a higher likelihood of the door opening) etc. If a road-adjacent door opens and/or if there is the possibility of a road-adjacent door opening at 415 (the possibility being determined by there being an occupant in a road-adjacent seat, for example) the vehicle 101 expands the perimeter further at 417. Also, in this example, the vehicle 101 adds a slow notification at 419 to a broadcast because at least one door has opened and therefore there is an increased chance of door collision and/or occupant collision if the occupant leaves the vehicle. The vehicle 101 then rebroadcasts the amended perimeter at 421.

To keep pace with movement of vehicle occupants, the vehicle 101 also determines in this example whether there was a change in seat state at 423. This can include an exit-event and/or an occupant moving from one seat to another, road-adjacent seat. If this occurs, and there is an enhanced likelihood that the occupant is outside the vehicle or about to be outside the vehicle road-adjacent, the vehicle 101 can add a further slow component at 427 and rebroadcast the notification at 429.

Without limitation, an example of how this may occur is as follows. A vehicle 101 stops alongside a highway at a first enhanced perimeter is defined and shared based on, for example, the roadside speed limits. Once a door opens the vehicle 101 expands the perimeter and further expands that perimeter if the door that opened is road-adjacent and for if an occupant is road-adjacent next to an open or unlocked door. The vehicle 101 adds a slow component (e.g., recommends speed limit—X mph) and reshares the new perimeter, having been further expanded. The occupant then exits the seat, causing vehicle 101 to further expand the perimeter to at least include a path to a front or rear compartment or tire and adds a further slow recommendation (e.g., speed limit-X-Y) and reshares the newly expanded perimeter and notification. Thus, by the time a person is outside the vehicle 101, other vehicles 121 are potentially treating a wide perimeter around the vehicle 101 as an occupied perimeter to be avoided as though there were an object there.

If any state reverts (door closes, all previously detected occupants again detected within vehicle, compartment closes, etc) at 431, the vehicle 101 can reduce the perimeter at 433 and reshare the perimeter. This process can go back and forth between expanded and reduced perimeters based on state changes until the vehicle 101 again begins moving.

Human occupants may also use any sort of interior display (or vehicle-connected display, such as a mobile device) to indicate intended footpaths or changes to a vehicle perimeter (e.g., a long-load being carried). This can be verbally or physically input, and may include input in the form of text (e.g., expand perimeter 4' rearwards) selection or a map showing the perimeter whereby the edges can be dragged outwards or redefined. A visual representation of the perimeter can also be displayed on the display, so the occupant knows where the expanded perimeter is already defined, in case the occupant wants to walk within the expanded perimeter and/or further expand the perimeter.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety and are understood to be examples of types of processes that may be performed to achieve elements of the invention. Additional steps may be added or removed from the exemplary processes as desired.

With respect to the illustrative embodiments described in the figures showing illustrative process flows, it is noted that a general-purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:
1. A vehicle comprising:
a processor configured to
detect, while the vehicle is stationary, a perimeter-modification event including a state change of a state of the vehicle, predefined as correlating to a change in a vehicle perimeter surrounding the vehicle defining an avoidance zone for other vehicles;
responsive to the perimeter-modification event, define an expanded avoidance zone for the vehicle while the vehicle is stationary, larger than a perimeter size of the vehicle perimeter predefined as representing the vehicle in travel, in accordance with a predefined modification to the perimeter associated with the detected perimeter modification event; and wirelessly share the expanded vehicle perimeter defining the expanded avoidance zone with at least one other vehicle.

2. The vehicle of claim 1, wherein the perimeter-modification event includes a door-unlock event.

3. The vehicle of claim 1, wherein the perimeter-modification event includes a door-opening event.

4. The vehicle of claim 3, wherein the predefined modification includes expanding the vehicle perimeter to accommodate at least a predefined path of the door from closed to fully open.

5. The vehicle of claim 1, wherein the perimeter-modification event includes a vehicle compartment opening.

6. The vehicle of claim 5, wherein the predefined modification includes expanding the perimeter to accommodate at least a path of predefined size from an occupied vehicle seat to the vehicle compartment.

7. The vehicle of claim 1, wherein the processor is further configured to determine a location of the vehicle and wherein the predefined modification varies based on a characteristic associated with the location of the vehicle.

8. The vehicle of claim 7, wherein the characteristic includes whether the vehicle is in a location predefined as a parking location.

9. The vehicle of claim 7, wherein the characteristic includes whether the vehicle is in a location within predefined proximity to a road.

10. The vehicle of claim 9, wherein the characteristic includes a speed limit of the road.

11. The vehicle of claim 1, wherein the processor is configured to share the expanded vehicle perimeter with at least one infrastructure element.

12. The vehicle of claim 1, wherein the processor is configured to share the expanded vehicle perimeter with the at least one other vehicle via sharing indirectly through a remote server.

13. A method comprising:
   determining that a vehicle has stopped in a location having a characteristic indicating that the location is not part of a parking lot;
   defining an expanded vehicle perimeter, larger than a perimeter predefined as representing the vehicle while the vehicle is traveling, responsive to the determining and based at least in part on a speed limit associated with a road within a predefined distance of the location; and
   wirelessly sharing the expanded vehicle perimeter with at least one other vehicle.

14. The method of claim 13, wherein the characteristic includes the location being predefined as a road-shoulder.

15. The method of claim 13, wherein the characteristic includes the location being at least a predefined distance from any known traffic controls.

16. The method of claim 13, further comprising:
   determining that at least one vehicle door, adjacent to a vehicle seat detected as being occupied, is also adjacent to the road based on vehicle heading; and
   defining the expanded perimeter further based on a predefined expansion corresponding to determining that the door is adjacent to the road.

17. The method of claim 13, further comprising:
   determining that at least one vehicle door has been opened; and
   defining the expanded perimeter based also on a predefined expansion corresponding to determining that the door has been opened.

18. The method of claim 13, further comprising:
   determining that at least one vehicle occupant has exited a seat; and
   defining the expanded perimeter based also on a predefined expansion corresponding to determining that the occupant has exited the seat.

19. The method of claim 13, wherein the expanded vehicle perimeter includes at least a path of predefined width traveling from an occupied vehicle seat to a vehicle location determined to correspond to a vehicle diagnostic or sensor value indicating vehicle trouble.

20. A non-transitory storage medium, storing instructions that, when executed by a vehicle processor, cause the vehicle processor to perform operations comprising to:
   define an expanded vehicle perimeter, larger than a perimeter predefined as representing the vehicle in travel, responsive to determining that a vehicle has stopped and that a vehicle compartment including at least one of a trunk or engine compartment has been unlatched or opened, wherein the perimeter includes at least a path leading from an occupied vehicle seat to the compartment, and wherein the path is at least as wide as a fully opened vehicle door adjacent to the occupied seat; and
   wirelessly share the expanded vehicle perimeter with at least one other vehicle.

* * * * *